United States Patent Office 3,833,696
Patented Sept. 3, 1974

3,833,696
METHOD OF MAKING A DISPLAY
DEVICE FOR PLANTS
Fritz Kramer, 60—11 Broadway,
Woodside, N.Y. 11377
Continuation-in-part of abandoned application Ser. No. 259,483, June 5, 1972. This application July 9, 1973, Ser. No. 377,286
Int. Cl. B29d 27/00
U.S. Cl. 264—51     7 Claims

ABSTRACT OF THE DISCLOSURE

A display device for cut flowers is prepared by injecting an aqueous solution of urea-formaldehyde precondensate containing about 40% by weight of solids, a small amount of phosphoric acid as a catalyst, and a foam-stabilizing surfactant, with compressed air into an open polyethylene bag, and heat-sealing the open side of the bag before the water could evaporate from the foam which gradually solidifies. When small holes are punched in the bag and the stems of flowers are inserted, the flowers are kept fresh.

---

Figure 1:
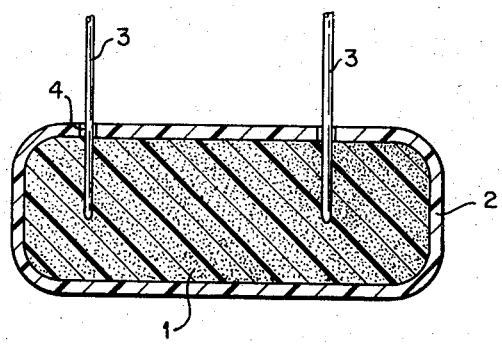

This application is a continuation-in-part of my copending application Ser. No. 259,483, filed on June 5, 1972, and now abandoned.

This invention relates to the display of plants, and particularly to a method of making a device for displaying cut flowers.

It is common practice to insert the stems of cut flowers in a block of plastic foam, such as cellular, rigid phenol-formaldehyde, to hold them in a desired position. However, the flowers wilt quickly unless provided with moisture, and it has been proposed to treat the normally hydrophobic foam with wetting agents so that the cellular body will admit or retain the water necessary for maintaining the fresh appearance of the flowers. The flowers supported in the foamed plastic may be displayed in a shallow dish wide enough to hold and at least partly conceal the block. When it is desired to display the flowers in a vase too narrow to receive the block, it is necessary to crush the cellular and friable material, to place the broken pieces in the vase, and to insert the flower stems in the particulate mass which holds them in a desired position.

It is relatively costly to produce rigid phenolic foam hydrophilic enough for use in displaying flowers, and the dust and other small particles formed when a solid block of phenol-formaldehyde foam is crushed are relatively difficult to remove from the table or other surface on which the flower display is being prepared and from the hands of the preparer.

The primary object of this invention is the provision of a display device for cut flowers and other plants in which plastic foam is employed as a support for the plant stems, but which is free of the afore-described shortcomings of the known devices and materials.

A display device prepared according to the invention comprises an envelope of plastic film practically impervious to water vapor and having dimensions of not less than 2 inches nor more than 12 inches when laid out flat, and urea-formaldehyde foam containing at least 3 percent water sealed in the envelope, all percentage figures herein being by volume unless stated otherwise, and being determined at 20° C. and 760 mm. Hg. The water vapor permeability of the envelope material should not be significantly higher than that of low-density polyethylene to prevent moisture loss. Urea-formaldehyde foam in which at least 3% water is uniformly distributed over a resin content of 0.5 to 3.0% is hydrophilic. It can supply at least a small amount of moisture to flower stems inserted into the foamed plastic through openings pierced in the envelope, and it readily absorbs additional water as may be needed. If it is desired to place the display device in a vase or other container too narrow to receive the envelope containing the unitary solid body of plastic foam, the foam may be crushed in the sealed envelope so that the envelope and its contents may be shaped to suit the dimensions of a vase or like container, the flower stems may be inserted into the envelope and the foam and flowers placed in the vase with or without additional water, as may be needed.

Other features, additional objects, and many of the attendant advantages of this invention will readily be appreciated as the invention is better understood by reference to the following detailed description of preferred embodiments when considered in connection with the appended drawing in which dimensions have been exaggerated for the sake of clarity.

Figure 2:
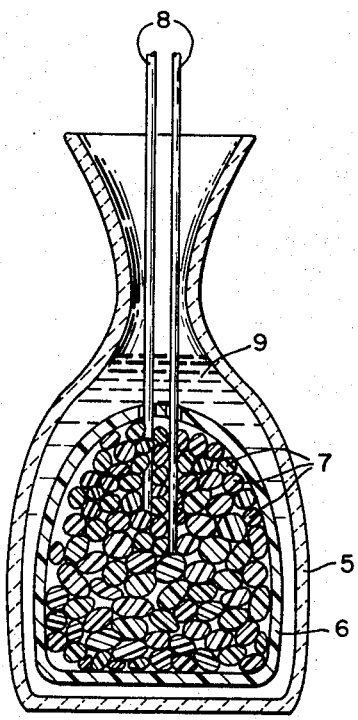

FIG. 1 shows a display device of the invention and flowers held thereby in elevational section; and FIG. 2 illustrates the use of a display device similar to that illustrated in FIG. 1 in a tall and narrow vase, the view being in elevational section.

Referring now to the drawing in detail, and initially to FIG. 1, there is seen a block 1 of cellular urea-formaldehyde resin conformingly enclosed in an envelope 2 of polyethylene film having the shape of an elongated tube. Stems 3 of flowers, not otherwise shown, pass through respective small holes 4 in the film envelope 2 and are received in recesses of the plastic foam block 1.

FIG. 2 shows a vase 5 whose cavity is partly occupied by a polyethylene bag 6 filled with coarse particles 7 of urea-formaldehyde resin foam. Stems 8 of flowers (not themselves shown) enter the mass of particulate foam through openings in the bag 6 and project upward from the vase 5. Water 9 in the vase 5 covers the bag 6 and its contents.

The block 1 of plastic foam was prepared by blowing an aqueous solution of urea-formaldehyde precondensate containing about 40% by weight of solids, a small amount of acid catalyst, such as phosphoric acid, and a foam-stabilizing surfactant such as Teepol 610, a mixture of sodium salts of higher secondary alkyl sulfates, derived from petroleum, with compressed air from a nozzle as described in Bauer Pat. No. 2,860,856 into an open polyethylene bag and heat-sealing the open side of the bag before the water could evaporate from the foam which gradually solidified.

The display device of the invention was ready for use thereafter as is shown in FIG. 1. The small holes 4 were pierced in the envelope 2 one by one by means of a coarse pin, and the flower stems 3 were inserted through the holes into the plastic foam which yielded under the pressure of the inserted stems to form suitable recesses.

The display device illustrated in FIG. 2 was similarly prepared by injecting a urea-formaldehyde foam mixture into the polyethylene bag 6, sealing the bag, and permitting the foam to set. It was then crushed readily in the sealed bag by manual pressure without releasing dust or other small particles. The foam-bearing bag could then be shaped similarly to a bean bag to make it pass the narrow orifice of the vase 5. Holes were formed in the bag 6, and recesses were formed in the mass of particulate resin foam by pushing the flower stems 8 through the orifice of the vase 5 and into the bag 6.

Unless the vase 5 is partly filled with water, the resin foam gradually loses its moisture and cannot keep the flowers fresh, but the period during which no water need to be added depends on the nature of the plants and on the initial water content of the foam.

The initial aqueous solution of urea-formaldehyde precondensate may be diluted as required to yield a foam containing between 0.5 and 3.0 percent resin solids, 3 to 50 percent water, and 49.5 to 96.0 percent air, all percentage values being by volume. Depending mainly on the air content, the bulk density of the foam may vary between 1 lb./cu. ft. and 23 lbs./cu. ft. If the original water is permitted to evaporate, the dry foam becomes hydrophobic and is no longer useful as a support for a display of cut flowers or other living plants which require water.

Polyethylene bags of the dimensions necessary for a flower display, that is, having dimensions of not less than 2" and not greater than 12", when laid out flat, are staple articles of commerce in thicknesses of 1 mil or more, a thickness of 3 mils being usually most convenient. The thickness of the bag, however, is not critical and any essentially two-dimensional material not more than 10 mils thick is being referred to as film in this application.

In preparing display devices of the invention on a substantial scale, I prefer to fill a polyethylene tube, approximately 2" to 6" in diameter, and of great length with catalyzed aqueous urea-formaldehyde precondensate foam from an air nozzle, as described in the afore-mentioned patent, to compress the filled bag at suitably spaced longitudinal intervals between the electrodes of a high-frequency heat sealing apparatus so as to displace the still fluid foam and permit sections of the tube to be sealed from each other, and then to cut the tube into individual display devices by bisecting the seams before or after the enveloped foam has set.

The display devices of the invention are intended for use by florests and by their clients who do not normally prepare the foam plastic themselves. It is essential, therefore, that the film be sufficiently impermeable to water vapor to permit the plastic blocks to be prepared at a manufacturing plant weeks or months before they are actually used. Low-density polyethylene film has a normal water vapor permeability of 1.3 gm./100 in.$^2$/24 hours/mil at 25° C. when determined according to A.S.T.M. Standard E–96–635(E), and has been found eminently suitable for the purpose of the invention. Obviously, other plastic film material whose water vapor permeability is not significantly higher may be employed, but none is known to me at this time that would not be more costly than low-density polyethylene.

Similar economic considerations militate against the use of foam plastic other than urea-formaldehyde foam in the display devices of my invention. Urea-formaldehyde foam has the ability of solidifying without losing its hydrophilic properties in the presence of at least 3% water, and it can solidify in the presence of liquid water amounting to 50% of the foam volume, the volume including the air in the cells of the foam. While other foam plastics may be similarly useful, they are not of economic value at this time because of their cost.

Keeping the plastic foam sealed in an envelope practically impervious to water vapor until immediately prior to use not only preserves the water content, but also facilitates handling of the friable plastic so that at least 90% of the foam remains a unitary body during normal handling and prevents dust or other particles formed by crushing the initial, unitary block of foam from soiling a work area. The crushed, enveloped foam can readily be shaped to fit a desired container.

While the invention has been described with reference to specific embodiments, it is to be understood that it is not limited thereto, but is to be construed broadly and limited solely by the scope of the appended claims.

What is claimed is:

1. A method of making a device for displaying plants which comprises:
    (a) injecting a foam consisting of a liquid enclosing bubbles of a gas through an opening into an envelope of plastic film substantially impermeable to water vapor,
        (1) said liquid essentially consisting of an aqueous solution of urea-formaldehyde precondensate, an amount of acid catalyst sufficient to cause setting and solidification of said precondensate at ambient temperature, and an amount of surfactant capable of stabilizing said foam until said precondensate solidifies; and
    (b) sealing said opening before a significant portion of the water in the injected aqueous solution escapes through said opening in the form of water vapor,
        (1) the volume ratio of said precondensate, said water, and said air in said foam being 0.5 to 3.0 parts precondensate to 3.0 to 50.0 parts water to 49.5 to 96.00 parts gas.

2. A method as set forth in claim 1, wherein the water vapor permeability of said film is not significantly higher than 1.3 gm./100 in.$^2$/24 hours/mil at 25° C. when determined according to A.S.T.M. Standard E–96–635(E).

3. A method as set forth in claim 1, wherein said film essentially consists of polyethylene.

4. A method as set forth in claim 1, wherein said envelope constitutes an elongated tube, each of a plurality of longitudinally spaced portions of said tube are compressed after said injecting and prior to the setting of said foam with a force sufficient for displacing said foam and for abuttingly engaging opposite walls of said tube, and securing said walls to each other.

5. A method as set forth in claim 4, wherein said opposite walls are secured to each other along a seam transverse to the direction of elongation of said tube and sealing respective longitudinal sections of said tube from each other.

6. A method as set forth in claim 5, wherein said tube is sectioned along said seams into individual display devices.

7. A method as set forth in claim 1, wherein said gas is air.

References Cited
UNITED STATES PATENTS

| | | | |
|---|---|---|---|
| 2,753,277 | 7/1956 | Smithers | 264—Dig. 002 |
| 2,789,095 | 4/1957 | Linvig | 264 Dig. 002 |

MELVYN I. MARQUIS, Primary Examiner

U.S. Cl. X.R.

156—78, 79; 260—2.5 F; 264—45, Dig. 002